(12) United States Patent
Hatano et al.

(10) Patent No.: US 6,290,900 B1
(45) Date of Patent: Sep. 18, 2001

(54) MOLTEN METAL VESSEL FOR FILTERING IMPURITIES

(75) Inventors: Tomoyuki Hatano, Nagoya; Takeshi Nagasaka, Kariya; Hiromi Takagi; Sumi Yoshikawa, both of Nagoya; Shunji Mochizuki, Amagasaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/265,981

(22) Filed: Mar. 11, 1999

(30) Foreign Application Priority Data

Mar. 13, 1998 (JP) .................................................. 10-082866

(51) Int. Cl.$^7$ ...................................................... C22B 9/02
(52) U.S. Cl. ............................ 266/227; 266/94; 266/208; 266/212; 266/235; 164/134
(58) Field of Search ..................................... 266/227, 235, 266/212, 208, 94, 239; 75/407, 678, 594, 654, 646, 582; 164/134

(56) References Cited

U.S. PATENT DOCUMENTS

| | | | |
|---|---|---|---|
| 4,113,241 | 9/1978 | Dore | 266/227 |
| 4,967,827 | 11/1990 | Campbell | 164/134 |
| 5,114,472 | * 5/1992 | Eckert et al. | 75/412 |
| 5,904,894 | * 5/1999 | Mukohda | 266/220 |
| 5,908,488 | * 6/1999 | Schroder et al. | 75/386 |

FOREIGN PATENT DOCUMENTS

| | | |
|---|---|---|
| 3-77761 | 4/1991 | (JP) . |
| 7-71880 | 3/1995 | (JP) . |

* cited by examiner

Primary Examiner—Roy King
Assistant Examiner—Tima McGuthry-Banks
(74) Attorney, Agent, or Firm—Pillsbury Winthrop LLP (57) ABSTRACT

A molten metal vessel includes a first chamber for containing molten metal such as molten aluminum therein, a filtration chamber in which impurities contained in the molten metal are removed, and a second chamber for reserving clean molten metal to be supplied to a casting die. The molten metal flows from the first chamber to the second chamber through the filtration chamber. A pair of filters, preferably a pair of cylindrical filters, are disposed in the filtration chamber, so that the impurities contained in the molten metal can be filtered twice. The filters are attached to the bottom of the filtration chamber where molten metal oxides hardly develop, so that the filters are easily replaced with new ones for the maintenance purpose. A rod-shaped heater may be disposed in the cylindrical filters to keep the molten metal temperature in a strictly controlled range. Thus, the impurities are effectively removed from the molten metal through the filters which are easily replaceable.

14 Claims, 5 Drawing Sheets

MOLTEN METAL VESSEL FOR FILTERING IMPURITIES

CROSS-REFERENCE TO RELATED APPLICATIONS

This application is based upon and claims benefit of priority of Japanese Patent Applications No. Hei-10-82866, filed on Mar. 13, 1998, the contents of which is incorporated herein by reference.

BACKGROUND OF THE INVENTION

1. Field of the Invention

The present invention relates to a vessel for holding molten metal and supplying the same to a casting die after filtering impurities contained in the molten metal.

2. Description of Related Art

A vessel for holding molten metal therein and for filtering impurities contained in the molten metal is disclosed in JP-A-7-71880. Impurities such as metal oxides or other foreign particles are removed from the molten metal before the molten metal is supplied to a casting die. The vessel disclosed in the above-publication is briefly shown in FIG. 8 attached hereto.

Figure 8:
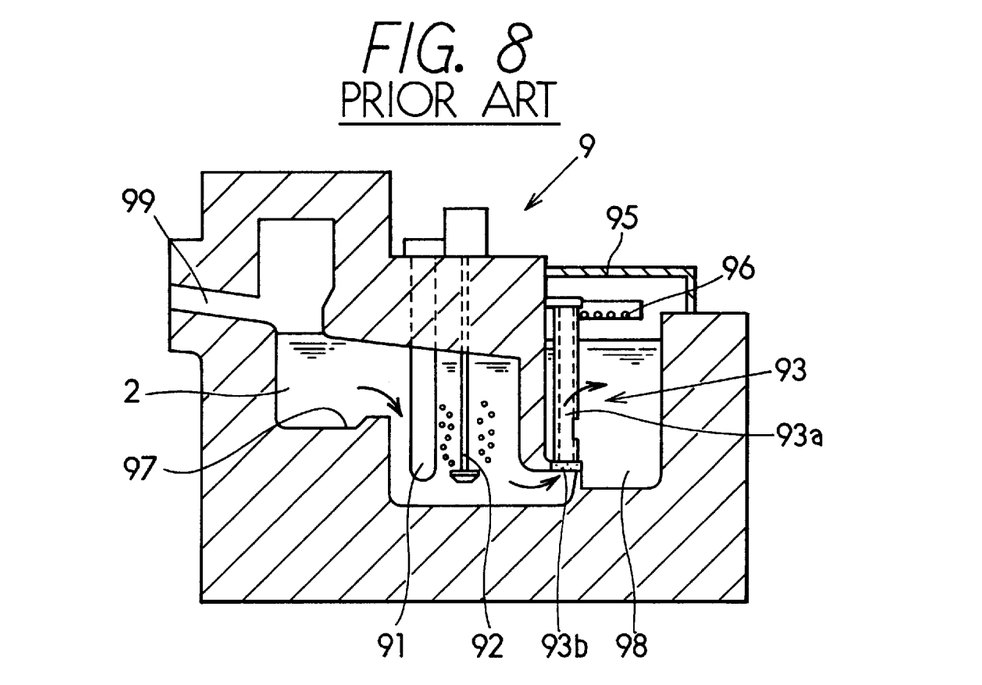
FIG. 8 is a cross-sectional view showing a conventional molten metal vessel.

The vessel 9 includes a melting chamber 97 and a reservoir chamber 98. A metal ingot is supplied to the vessel from an opening 99 and melted in the melting chamber. A burner 91 is submerged in the molten metal 2. An impurity separator 92 is also submerged in the molten metal and blows out inert gas therefrom to bring impurities contained in the molten metal on the surface of the molten metal. A ceramic filter 93b held by a hollow filter holder 93a is located at an inlet port of the reservoir chamber 98. Impurities contained in the molten metal 2, such as metal oxides and foreign particles, are filtered through the filter 93b, and clean molten metal is supplied to the reservoir chamber 98. An upper opening of the reservoir chamber 98 is covered by a cover plate 95 which is opened when the molten metal is taken out. When the cover 95 is opened, inert gas is blown from an inert gas supplier 96 to prevent the molten metal from being oxidized.

An outer periphery of the filter 93b is tightly fastened to a vessel body to prevent the molten metal from flowing through without being filtered. The top portion of the filter holder 93a is fixed to the vessel body. The filter 93b has to be replaced periodically to keep the filter meshes clean. In this filter structure, both the filter holder 93a and the filter 93b have to be replaced together, thereby making the maintenance cost high.

The filter structure may be modified by replacing the whole filter 93 with a filter plate, the outer periphery of which is fastened to a groove formed on the vessel body to prevent leakage flow of the molten metal and the top of which is sticking out above the molten metal surface. When the molten metal is aluminum, for example, the vessel body is made of a material obtained by sintering a mixture mainly composed of silicon oxide and alumina. Though the vessel body material of this kind is hard to react with the molten aluminum kept at a high temperature, it is difficult to keep the vessel body completely unaffected by the molten aluminum. Especially on the surface of the molten metal where the molten metal is easily oxidized, aluminum oxides stick to the wall of the vessel body. Once a spot of the aluminum oxides is formed on the wall, the aluminum oxides gradually grow on the wall around the spot. The filter periphery fastened to the groove formed on the vessel wall will be tightly fixed to the wall by the aluminum oxides, and the shape of the filter periphery will be deformed. As a result, it becomes difficult to replace the filter for maintenance, and moreover a new filter cannot be fastened to the groove.

Further, in the conventional vessel shown in FIG. 8, it is difficult to completely prevent oxidation of the molten metal surface when the cover 95 is open to take out the molten metal even inert gas is blown toward the surface. The molten metal is taken out from the vessel with a ladle. Therefore, the molten metal is oxidized by contacting air, and solid oxides are formed on the surface of the molten metal, which in turn are mixed into the molten metal. Thus, it is difficult, in the conventional vessel, to supply clean molten metal to the casting die.

SUMMARY OF THE INVENTION

The present invention has been made in view of the above-mentioned problems, and an object of the present invention is to provide a molten metal vessel in which impurities contained in the molten metal are effectively removed. Another object of the present invention is to provide an improved structure of a filter, so that the filter can be easily replaced for its maintenance. Further object of the present invention is to provide a molten metal vessel from which clean molten metal is effectively supplied to a casting die without being oxidized.

According to the present invention, a molten metal vessel includes a first chamber in which molten metal is contained, a filtration chamber having a pair of filters for removing impurities, and a second chamber in which the filtered molten metal to be supplied to a casting die is reserved. The molten metal flows from the first chamber to the second chamber through the filtration chamber. Impurities such as metal oxides and foreign particles are removed from the molten metal in the filtration chamber.

The molten metal may be supplied from a separate melting furnace to the first chamber, or solid metal may be melted in the first chamber. Preferably, a burner is submerged in the molten metal contained in the first chamber, and solid metal is dipped in the molten metal to be melted in the first chamber. By using the submerged burner, oxidation of the molten metal can be suppressed to a lower level. A pair of ceramic filters are disposed in the filtration chamber so that the impurities are filtered twice. Preferably, cylindrical filters having a larger filtering surface than plate-shaped filters are disposed in the filtration chamber. A pair of cylindrical filters are positioned laterally or coaxially with each other. The filtration chamber is preferably intercepted from the atmosphere to prevent molten metal oxidation, and an upper space above the molten metal surface is filled with inert gas. A molten metal supply pump may be disposed in the second chamber to supply the filtered clean molten metal to a casting die. The supply pump is intercepted from outside air to avoid oxidation of the molten metal. The molten metal in the second chamber is sucked into the supply pump from underneath the molten metal surface not to suck the impurities if such is afloat on the surface.

Bottom ends of the cylindrical filters abut the bottom of the filtration chamber so that no molten metal flows without passing through the filters. Preferably, the bottom ends of the cylindrical filters are fastened to grooves formed on the bottom of the filtration chamber. Since the bottom ends of the cylindrical filters are attached to the bottom of the filtration chamber where no metal oxides are developed, the cylindrical filters are easily replaced with new ones for the maintenance purpose.

Preferably, an impurity separator is disposed upstream of the filters so that impurities developed in the first chamber are removed from the molten metal before the molten metal reaches the filters. The impurity separator is dipped in the molten metal to supply inert gas bubbles which attract impurities contained in the molten metal and make them afloat on the surface of the molten metal. It is preferable to position one filter having a larger mesh size upstream of the other filter having a smaller mesh size to effectively screen the impurities and to prolong the life of the filters. Preferably, a rod-shaped heater for keeping the molten metal temperature in a desired range is disposed in the center of cylindrical filters, or at least in the center of one of the filters.

Other objects and features of the present invention will become more readily apparent from a better understanding of the preferred embodiments described below with reference to the following drawings.

DETAILED DESCRIPTION OF THE PREFERRED EMBODIMENTS

A first embodiment of the present invention will be described with reference to FIGS. 1 and 2A–2D. A molten metal vessel 1 includes a first chamber 17 for containing molten metal 2 therein and a second chamber 18 which is a reservoir chamber for reserving the molten metal therein, both chambers being formed in a vessel body 10. A burner 11 is submerged in the molten metal 2 contained in the first chamber 17. An impurity separator 12 is also disposed in the first chamber 17. A pair of ceramic filters 13 are disposed between the first chamber 17 and the reservoir chamber 18 (the second chamber), and a molten metal supply pump 14 is disposed in the reservoir chamber 18. The molten metal 2 in the first chamber 17 moves toward the reservoir chamber 18 through the ceramic filters 13 and is supplied to a casting die 3 by operation of the molten metal pump 14 through a pipe 4. The molten metal 2 moves from the left side to the right side of FIG. 1 along arrows shown therein without contacting air.

Figure 1:
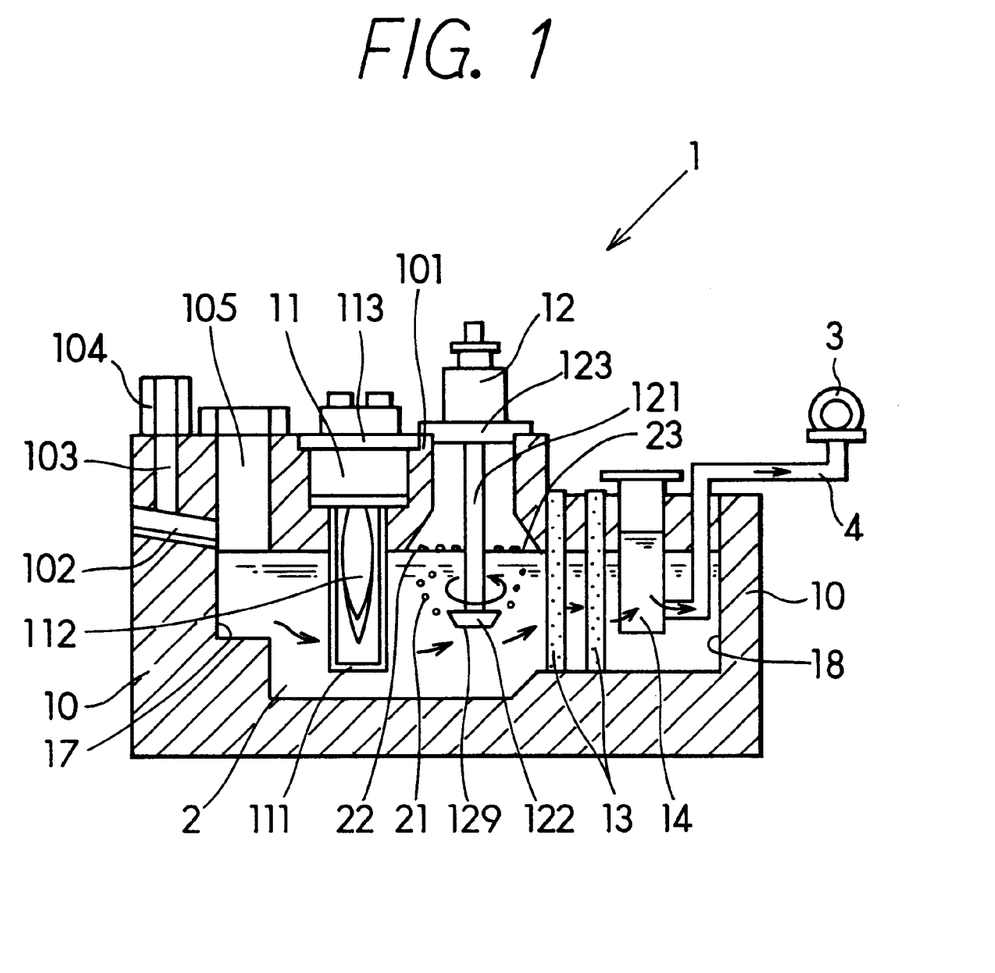
FIG. 1 is a cross-sectional view showing a molten metal vessel as a first embodiment of the present invention.

The submerged burner 11 is supported by a supporting plate 113 which is held on an upper portion 101 of the vessel body 10. A ceramic tube 111 is submerged in the molten metal 2 contained in the first chamber 17, and burner flame 112 in the ceramic tube 111 heats up indirectly the molten metal 2. Metal ingots are supplied to the vessel 1 from an inlet opening 102 and dipped into the molten metal 2 to be melted there. The impurity separator 12 is supported by a supporting plate 123 which is also held on the upper portion 101 of the vessel body 10. The impurity separator 12 has a rotary shaft 121 carrying an impeller 122 at its bottom end 129. The impeller 122 is submerged in the molten metal 2. The impeller 122 rotates, while inert gas is blown out from the bottom end 129 of the rotary shaft 121. As a result, the inert gas is made fine bubbles and dispersed into the molten metal, and impurities such as metal oxides and foreign particles are attached to bubbles 21 of the inert gas. The impurities attached to the bubbles come up to the molten metal surface 23, and thereby they are separated from the molten metal. The inlet opening 102 is connected to an exhaust port 103 which is further connected to the atmosphere through a connector 104. Metal material returned from a casting machine as waste is supplied from an opening 105 in addition to the virgin ingots supplied from the inlet opening 102.

Figure 2A:
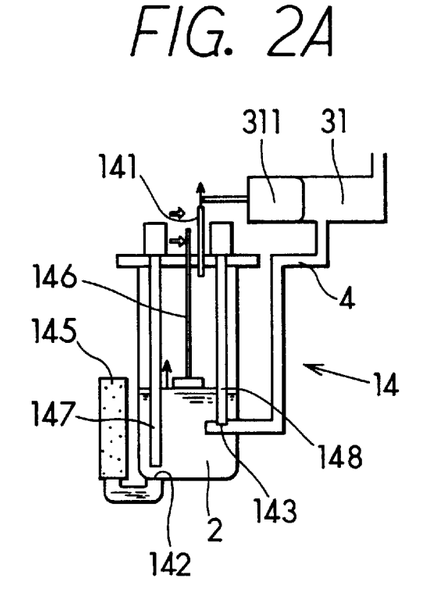
FIGS. 2A–2D are schematic views showing a process for supplying the molten metal to a casting die from the molten metal vessel shown in FIG. 1.
Figure 2B:
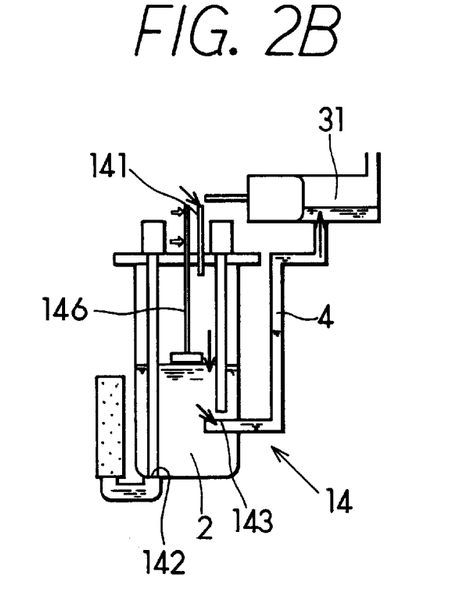

The operation of the molten metal supply pump 14 will be described with reference to FIGS. 2A–2D. First, the inside space of the pump 14 is brought into vacuum by a vacuum pump (not shown) connected to a pipe 141 as shown in FIG. 2A. Then, an inlet valve 147 opens a sucking port 142, and thereby the molten metal 2 reserved in the reservoir chamber 18 is sucked into the pump 14 through a filter 145. As shown in FIG. 2B, when a predetermined amount of the molten metal is sucked into the pump 14, the sucking port 142 is closed. Then, an outlet port 143 is opened and inert gas is supplied to the inside space of the pump 14 through the pipe 141 to pressurize the molten metal in the pump 14. Thus, the molten metal is supplied to a sleeve 31 of the casing die 3 through the pipe 4. Amount of the molten metal to be supplied to the sleeve 31 is controlled by measuring a surface level of the molten metal in the pump 14. That is, a position of a float 146 floating on the surface of the molten metal is measured by a photoelectric tube, for example.

Figure 2C:
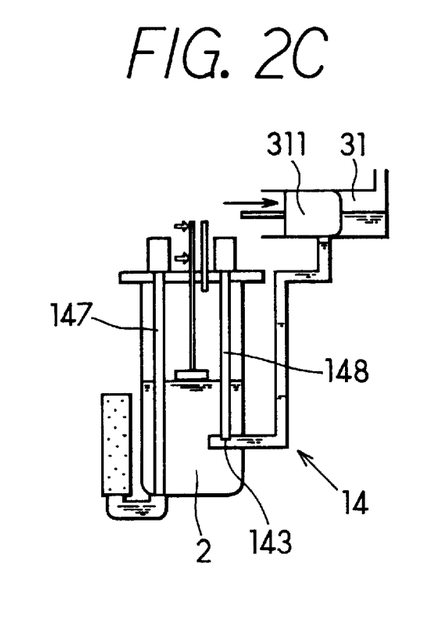
Figure 2D:
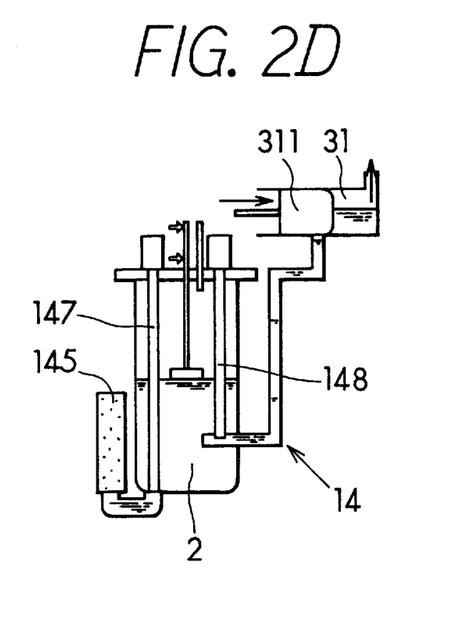

As shown in FIG. 2C, when a predetermined amount of the molten metal is supplied to the sleeve 31, a plunger 311 in the sleeve 31 moves forwards to close an inlet port of the sleeve 31. The molten metal in the sleeve 31 is injected into the casting die 3 by the plunger 311, as shown in FIG. 2D. Preferably, the die cavity is brought into vacuum before the molten metal is injected.

The molten metal vessel 1 as the first embodiment of the present invention has following advantages. Since the burner 11 is submerged in the molten metal and the solid metal material supplied from outside is melted in the molten metal, the temperature for melting the solid metal can be kept lower than that of the case where a burner for directly heating the solid metal is used. As a result, oxidation of the molten metal is suppressed. Since the impurity separator 12 is disposed downstream of the submerged burner 11, impurities such as metal oxides and foreign particles are removed by the separator 12 if they are developed around the burner 11. Since the ceramic filters 13 are disposed downstream of the separator 12, the molten metal reaches the ceramic filters 13 after impurities are removed by the separator 12. Therefore, the molten metal is already cleaned to a certain degree before it is filtered by the ceramic filters 13. Accordingly, the filter meshes can be kept clean without being blocked by the impurities for a longer time, or the ceramic filters having finer meshes can be used. In addition, since a pair of ceramic filters 13 are used in this embodiment, it is possible to place a filter having rough meshes upstream and a filter having fine meshes downstream. Thus, cleaner molten metal can be supplied to the casting die, and durability of the filters can be enhanced.

The molten metal 2 is supplied to the casting die 3 without contacting atmospheric air by the operation of the molten metal supply pump 14, and the molten metal 2 is sucked into the pump 14 from the inside of the reservoir chamber 18, not from the surface thereof. Therefore, the molten metal is not oxidized during the supply process, and no impurities are included in the molten metal supplied to the casting die even if some impurities exist on the surface of the molten metal in the reservoir chamber 18. Thus, high quality of the cast products is realized.

Figure 3:
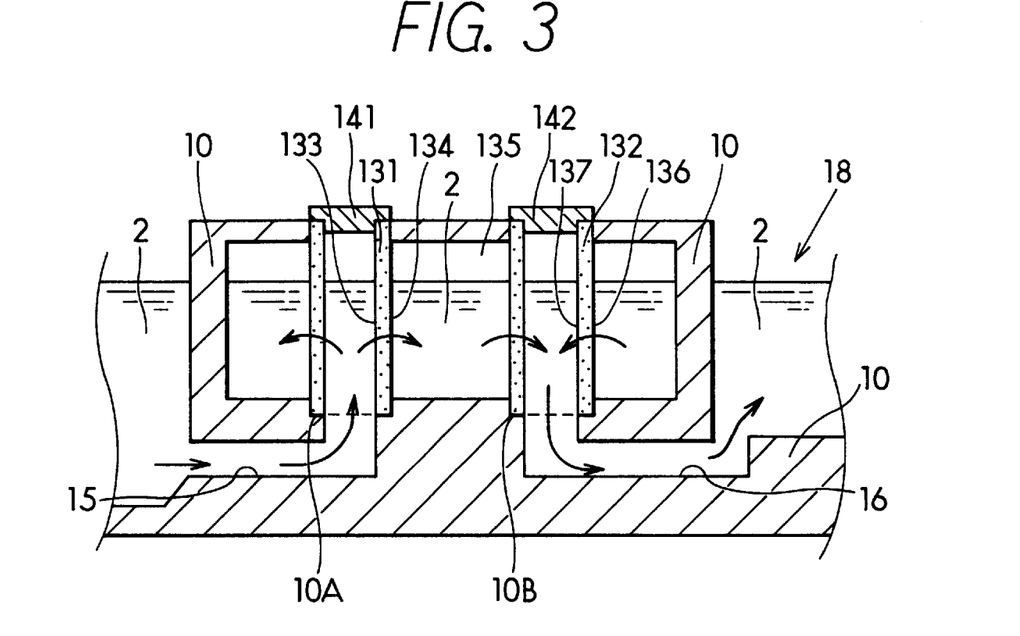
FIG. 3 is a cross-sectional view showing a part of a molten metal vessel as a second embodiment of the present invention.

Referring to FIG. 3, a second embodiment of the present invention will be described. In this embodiment, the plate-shaped ceramic filters 13 used in the first embodiment are replaced by a pair of cylindrical ceramic filters 131 and 132. Other structures are the same as those of the first embodiment. The vessel body 10 is formed to receive therein the pair of the cylindrical filters 131 and 132. The vessel body 10 is formed by sintering a mixture material in a die, the mixture being substantially composed of silicon oxides and alumina, and binder if necessary. The vessel body can be formed into an arbitrary shape.

A pair of cylindrical filters 131 and 132 are disposed in a filtration chamber 135 formed in the vessel body 10. The cylindrical filter 131 has an inner surface 133 and an outer surface 134, and the cylindrical filter 132 has an inner surface 137 and an outer surface 136. On the bottom surface of the filtration chamber 135, grooves 10A and 10B for receiving the bottom ends of cylindrical filters 131 and 132 are formed. Upper ends of the respective cylindrical filters 131, 132 are fixed to respective supporting plates 141, 142 and held by an upper portion of the filtration chamber 135. Both cylindrical filters 131, 132 are tightly held in the filtration chamber 135 so that no molten metal leaks through portions connecting the cylindrical filters and the vessel body 10. The filtration chamber 135 is intercepted from the atmosphere to prevent the molten metal from being oxidized. Preferably, an upper space above the molten metal surface is filled with inert gas, such as nitrogen or argon.

The molten metal 2 first enters the inner bore of the cylindrical filter 131 through an inlet passage 15 and flows out through its wall, and then enters the inner bore of the cylindrical filter 132 through its wall. After the molten metal 2 is filtered twice by both cylindrical filters, it flows out from the filtration chamber 135 to the reservoir chamber 18 through an outlet passage 16. Since the molten metal 2 is filtered twice, the impurities contained in the molten metal are surely removed. Since the cylindrical filter 131 located upstream has larger meshes and the cylindrical filter 132 located downstream has smaller meshes, large particles of the impurities are first removed by the filter 131, and then smaller particles are removed by the filter 132. Therefore, substantially all the impurities are effectively removed form the molten metal. In addition, since the filters 131, 132 are cylinder-shaped, their mechanical strength is high and their filtering area is large.

Since metal oxides are located mostly on the molten metal surface if they develop, and both cylindrical filters 131, 132 are held in the grooves 10A, 10B which are located far from the surface, the metal oxides do not stack around the grooves and the grooves are not deformed by those impurities. Therefore, the cylindrical filters 131, 132 can be easily replaced with new ones when necessary. Further, the filters can be replaced with new ones one by one without discontinuing the casting process. That is, while one filter is being replaced, the other filter performs its function, and thereby the molten metal cleaned by the other filter to a certain degree can be supplied to the casting die.

Figure 4:
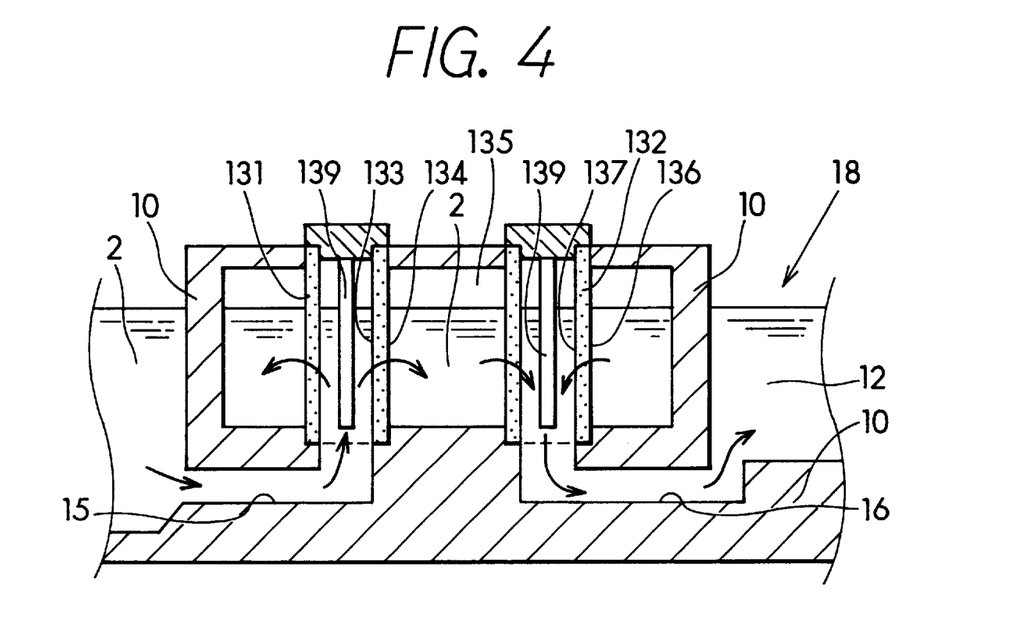
FIG. 4 is a cross-sectional view showing a part of a molten metal vessel as a third embodiment of the present invention.

A third embodiment of the present invention will be described with reference to FIG. 4. In this embodiment, a rod-shaped heater 139 is inserted in the inner bore of each cylindrical filter 131, 132. The rod-shaped heater 139 is positioned substantially in the center of the bore. Other structures of the third embodiment are the same as those of the second embodiment. The rod-shaped heaters 139 heat the molten metal in the bores of the cylindrical filters 131, 132, to prevent temperature drop in the molten metal.

Generally, an amount of metal oxides developed in the molten metal exponentially increases according to temperature rise in the molten metal. On the other hand, if the molten metal temperature is too low, the molten metal solidifies before it reaches the casting die. Therefore, the molten metal temperature has to be maintained within a proper range. The proper temperature varies according to a size and required quality of the products to be cast (for example, a predetermined temperature in a range of 680–750° C. in the case of aluminum castings). However, temperature deviation for a given product has to be kept within a certain limit. The rod-shaped heaters 139 inserted in the cylindrical filters function to maintain the molten metal temperature deviation within 3° C. If no such heaters are used, the temperature deviation is approximately 10° C. Since the rod-shaped heaters 139 are positioned at the center of the filter bores, the temperature of the molten metal in the reservoir chamber 18 becomes substantially uniform. Though the rod-shaped heater 139 is inserted in the inner bore of each cylindrical filter 131, 132 in the embodiment shown in FIG. 4, it may be inserted only in one cylindrical filter 132 located at an immediate upstream of the reservoir chamber 18.

Figure 5:
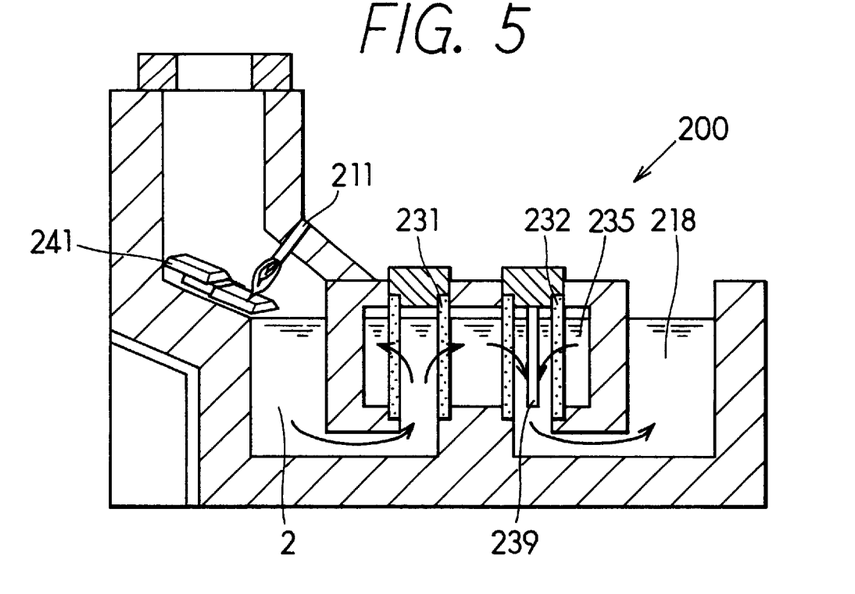
FIG. 5 is a cross-sectional view showing a molten metal vessel as a fourth embodiment of the present invention.

A fourth embodiment of the present invention will be described with reference to FIG. 5. In a molten metal vessel 200, the metal ingot 241 is melted by a direct burner 211. The filtration chamber 235 is similar to that of the third embodiment. A pair of cylindrical filters 231, 232 are held in the filtration chamber 235, and a rod-shaped heater 239 is inserted in the bore of the cylindrical filter 232 which is located at an immediate upstream of a reservoir chamber 218. Since the cylindrical filters 231, 232 have a higher filtration ability (about tow times according to experiments), compared with that of plate-shaped filters, the cylindrical filters can be properly applied to the molten vessel 200 in which the ingot 241 is directly melted by the burner 211 and a larger amount of metal oxides tend to be developed.

The rod-shaped heater 239 functions in the same manner as in the third embodiment. Preferably, the reservoir chamber 218 is intercepted from outside air to avoid oxidation of the molten metal reserved therein, and an inert gas blowing device may be added to the reservoir chamber 218. The molten metal reserved in the reservoir chamber 218 may be supplied to the casting die with a conventional ladle or any other device.

Figure 6:
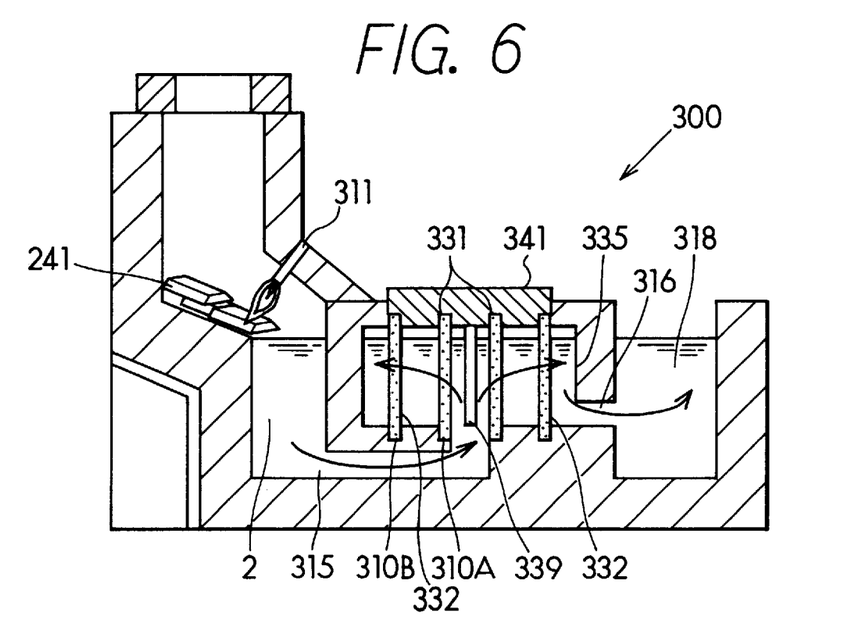
FIG. 6 is a cross-sectional view showing a molten metal vessel as a fifth embodiment of the present invention.
Figure 7:
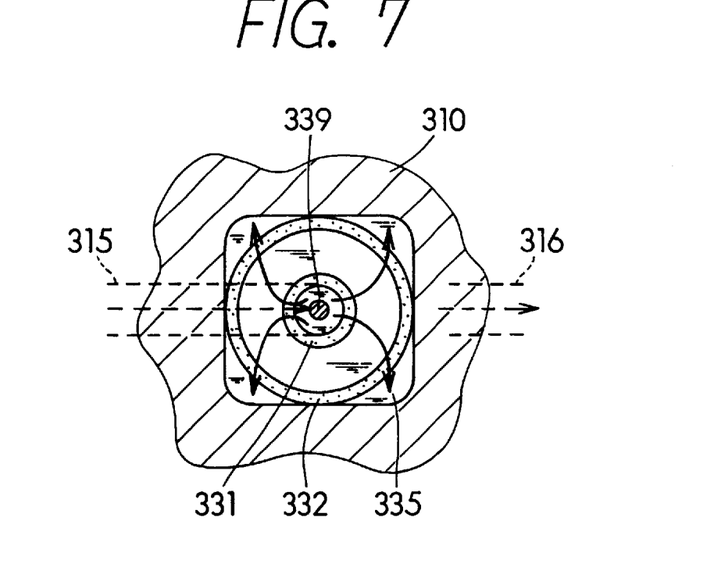
FIG. 7 is a plan view showing a filtration chamber of the molten metal vessel shown in FIG. 6.

A fifth embodiment of the present invention will be described with reference to FIGS. 6 and 7. A molten metal vessel 300 is similar to that of the fourth embodiment, except that a pair of cylindrical filters 231, 232 of the fourth embodiment are replaced with a coaxial double cylindrical filter set composed of an inner cylindrical filter 331 and an outer cylindrical filter 332, and that a rod-shaped heater 339 is inserted in the center of the inner cylindrical filter 331. The coaxial double cylindrical filter set is held in a filtration chamber 335 intercepted from the atmosphere. The bottom end of the inner cylindrical filter 331 is fastened to a groove 310A formed on a vessel body 310. Similarly, the bottom end of the outer cylindrical filter 332 is fastened to a groove 310B formed on the vessel body 310. Upper ends of both filters 331, 332 are held by a supporting plate 341 which is mounted on the upper portion of the vessel body 310.

The metal ingot 241 is directly melted by a burner 311, and the molten metal flows into the filtration chamber 335 through an inlet passage 315. Then, the molten metal 2 enters the inner cylindrical filter 331 where it is heated by the rod-shaped heater 339 to maintain its temperature. The molten metal 2 flows out from the inner cylindrical filter 331 through its wall, thereby the molten metal 2 being filtered. Then, the molten metal 2 enters a space between the inner and outer cylindrical filters and flows out therefrom through the wall of the outer cylindrical filter 332, thereby the molten metal 2 being again filtered. The molten metal 2 filtered by the coaxial double cylindrical filter set enters a reservoir chamber 318 through an outlet passage 316.

The supporting plate 341 is divided into two portions so that the inner cylindrical filter 331 and the outer cylindrical filter 332 can be replaced with new ones for maintenance one by one separately. The filtration chamber 335 may be modified to reverse the flow of the molten metal 2 in the filtration chamber 335. That is, the molten metal first enters the filtration chamber 335, and then it flows through the outer cylindrical filter 332 and the inner cylindrical filter 331 in this order. After the molten metal is cleaned, it flows out from the inner bore of the inner cylindrical filter 331 toward the reservoir chamber 318 through the outlet passage 316.

The preferred embodiments described above may be modified in various ways. For example, the impurity separator 12 used in the first embodiment may not be limited to only one, but plural impurity separators may be used. Though all the embodiments described above include a submerged burner or a direct burner for melting the supplied solid material, such a burner may be replaced by a heater which serves only to maintain the molten metal temperature in the vessel. In this arrangement, the molten metal prepared in a separate melting device is supplied to the vessel. Though two cylindrical filters are used in the second through fifth embodiments, three or more cylindrical filters may be used. The shape of the filters is not limited to a cylinder, but it may be any hollow-pillar including triangle, square or other polygonal pillars. Further, a cup-shaped filter may be used in place of the cylindrical filter. The vessel body in the embodiments described above is made by sintering a mixture substantially composed of silicon oxides and alumina. The vessel of this kind can be used for containing therein an aluminum alloy, a magnesium alloy, a zinc alloy and the like. However, if the vessel is used for a copper alloy, an iron alloy and the like, a high temperature-resistive material such as graphite, magnesium-chrome-brick, or the like has to be used as a material to form the vessel.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A molten metal vessel for filtering impurities contained in molten metal, the molten metal vessel comprising:
    a first chamber adapted to contain molten metal;
    an inlet passage;
    a filtration chamber connected to the first chamber through the inlet passage so that molten metal when contained in the first chamber flows into the filtration chamber;
    first and second filters independently disposed in the filtration chamber for filtering impurities contained in the molten metal, the filters being hollow-pillar-shaped and fastened to a bottom surface of the filtration chamber so that all the molten metal sequentially flows through the first and the second filters;
    an outlet passage; and
    a second chamber connected to the filtration chamber through the outlet passage, the second chamber reserving the molten metal after the impurities in the molten metal have been filtered out through the filters;
    wherein the inlet passage communicates with an inside space of the first filter, and the outlet passage communicates with an inside space of the second filter, said vessel being constructed and arranged such that molten metal, when present, first enters the inside space of the first filter, flows out through a wall of the first filter, enters the inside space of the second filter through a wall of the second filter, and finally flows out from the inside space of the second filter toward the second chamber, thereby filtering twice the impurities contained in the molten metal.

2. The molten metal vessel as in claim 1, further comprising a burner for melting solid metal, the burner being disposed in the first chamber.

3. The molten metal vessel as in claim 1, further comprising a molten metal supply pump for supplying the molten metal to a casting die while intercepting the molten metal from outside air, the molten metal supply pump being disposed in the second chamber to suck the molten metal thereinto from an inside of the molten metal reserved in the second chamber.

4. The molten metal vessel as in claim 1, further comprising a cover for intercepting molten metal reserved in the second chamber from outside air, and for allowing the molten metal to be supplied to a casting die.

5. The molten metal vessel as in claim 1, further comprising a plurality of grooves disposed at the bottom surface of the filtration chamber for receiving bottom ends of the first and second filters.

6. The molten metal vessel as in claim 1, wherein:
    the filtration chamber includes a closure for closing the filtration chamber against outside air to protect the molten metal from being oxidized.

7. The molten metal vessel as in claim 6, wherein:
    an upper space above a surface of the molten metal of the filtration chamber is filled with inert gas.

8. The molten metal vessel as in claim 1, wherein:
    the hollow-pillar-shaped first and second filters are cylindrical filters.

9. The molten metal vessel as in claim 1, further including a rod-shaped heater disposed along a center axis of at least one of the first and second filters.

10. The molten metal vessel as in claim 1, wherein:
    the first filter being positioned upstream in the molten metal flow, the second filter being positioned downstream in the molten metal flow, and the first filter having a coarser mesh size than the second filter.

11. A method of filtering impurities contained in molten metal, the method comprising:
    melting solid metal into molten metal;
    filtering impurities contained in the molten metal through a filter disposed in a filtration chamber intercepted from outside air, the filter includes a first filter and a second filter;
    wherein the filtering is performed by filtering the impurities through the first filter having a larger mesh size and then through the second filter having a smaller mesh size;

both the first and the second filters are cylinder-shaped, and positioned separately; and during filtering, the molten metal flows through the first cylindrical filter from its inside to outside, and then through the second cylindrical filter from its outside to inside; and supplying the filtered molten metal to a casting die without exposing the molten metal to outside air to prevent oxidation of the molten metal.

12. The method of filtering impurities contained in molten metal as in claim 11, further including heating solid metal to liquefy into molten metal by a heater submerged into the molten metal.

13. A method of filtering impurities contained in molten metal, the method comprising:

melting solid metal into molten metal;

filtering impurities contained in the molten metal through a filter disposed in a filtration chamber intercepted from outside air, the filter including a first filter and a second filter;

wherein the filtering is performed by filtering the impurities through the first filter having a larger mesh size and then through the second filter having a smaller mesh size;

the first filter is a small cylindrical filter and the second filter is a large cylindrical filter;

the first filter is positioned inside the second filter coaxially therewith; and during filtering, the molten metal flows through the first filter from its inside to outside, and then through the second filter from its inside to outside; and supplying the filtered molten metal to a casting die without exposing the molten metal to outside air to prevent oxidation of the molten metal.

14. The method of filtering impurities contained in molten metal as in claim 13, further including heating solid metal to liquefy into molten metal by a heater submerged into the molten metal.

* * * * *